# 3,216,990
CATALYSTS FOR POLYMERIZATION
Adam Orzechowski, Waltham, and James C. MacKenzie, Wellesley Hills, Mass., assignors to Cabot Corporation, Boston, Mass., a corporation of Delaware
No Drawing. Filed Apr. 1, 1963, Ser. No. 269,780
The portion of the term of the patent subsequent to Jan. 18, 1982, has been disclaimed
20 Claims. (Cl. 260—93.7)

This invention relates to the polymerization and copolymerization of mono-olefins and/or di-olefins such as ethylene, propylene, butene-1, styrene, isoprene and butadiene and includes within its scope improved catalysts for the polymerization of the aforementioned classes of monomers.

This application is a continuation-in-part of copending application, Serial No. 11,961, filed March 1, 1960, by Orzechowski and MacKenzie, now U.S. No. 3,166,541.

It is a principal object of the present invention to provide a process for the polymerization of mono- and di-olefins and mixtures thereof.

It is another object of this invention to provide novel catalysts for the polymerization of mono- and di-olefins and mixtures thereof.

Other objects of this invention will in part be obvious and will in part appear hereinafter.

Said copending application discloses catalyst components suitable for use in the polymerization and copolymerization of mono- and di-olefins, which components comprise the product of the metathetical reaction carried out under certain conditions between a halide-type compound of a Group IVa, Va or VIa metal and hydroxyl groups on the surface of carbon black. In accordance with the present invention, it has been discovered that excellent polymerization catalysts are obtained when said catalyst components are combined, under suitable conditions, with certain organometallic compounds comprising germanium, tin or lead.

The polymerization and copolymerization of the mono- and/or di-olefins can be effected at suitable temperatures within the range of from about −25° C. to about 250° C., and pressures ranging upwardly from about atmospheric pressures to any desired maximum pressure, for example, 30,000 p.s.i.g. or ever higher pressures.

Carbon blacks suitable for the purposes of the present invention generally include any carbon black with hydroxyl groups on the surface thereof. For example, the channel carbon blacks, and furnace carbon blacks are all generally suitable for the purposes of the present invention. Definitely preferred, however, are those finely-divided carbon blacks having a hydroxyl group content on the surface thereof of above about 0.5 milliequivalents per gram.

Halide-type compounds of Groups IV, Va or VIa (hereinafter generally referred to as transition metal halides) suitable for the purposes of the present invention, are compounds conforming to the general empirical formula $$TO_aX_b$$

wherein T is a metal of Groups IVa, Va or VIa (where the group numbers correspond to the Mendeleev Periodic System); O is oxygen; $a$ is a number from 0 to 2; each X is any halogen; and $b$ is a number from 1 to 6.

Examples of suitable compounds conforming to said general formula

are halides of Group IVa, Va or VIa metals such as titanium tetrachloride, zirconium tetrachloride, vanadium tetrachloride and titanium tetraiodide, and oxyhalides such as vanadium oxychloride and chromium oxychloride.

The conditions under which reaction between the transition metal halide and the finely-divided inorganic solid can be accomplished are subject to considerable variation as explained in detail in said copending application. However, in order to obtain a catalyst component with exceptionally high activity and reproducible character it has been found to be all important that the carbon black be essentially dry and anhydrous (i.e. free of molecular water in any form at the time it is brought into contact with the transition metal halide). In addition, it is recommended that said reaction be achieved so as to allow by-products of the reaction (for example, HCl) to be eliminated from the reaction zone in order to insure that said reaction goes to completion. Generally, said reaction can be carried out by contacting the carbon black with said transition metal halide, preferably in a solution thereof in an inert hydrocarbon medium, and maintaining the two reactants in intimate contact for a period of time sufficient to effect the desired chemical reaction resulting in the chemical bonding of the transition metal to the carbon black. The length of time required to effect a given amount of such reaction and chemical bonding is largely dependent upon the temperature of the reaction mixture. Generally speaking, almost any temperature between about 0° C. and about 300° C. can be used satisfactorily, but room temperature to about 105° C. is generally definitely preferred. Assuming provision is made for intimate contact of the dry carbon black and the transition metal halide, the *minimum* time required to accomplish the chemical reaction needed will vary from periods of about 10 hours at room temperature to periods of about 15 minutes at temperatures of 100° C. or over. Temperatures higher than about 300° C., e.g. 500° C. are completely needless and therefore of little or no interest.

Elimination of by-products of the reaction from the reaction zone, i.e. the reaction medium, can be accomplished in many ways, such as by sweeping the reaction vessel with an inert gas, by carrying out the reaction at sufficiently elevated temperatures to drive by-products out of the reaction zone, i.e. usually out of the reaction medium, or by complexing or reacting said by-products with suitable substances such as tertiary arsines, tertiary phosphines, terpenes, terpinenes, tetrasubstituted hydrazines, carbides such as calcium carbide, and other substances such as sodium hydride which will react or complex with said by-products and thereby eliminate them.

Organometallic compounds suitable for the purposes of the present invention are those compounds conforming to the empirical formula

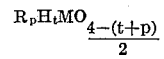

wherein each R is chosen from the group consisting of monovalent hydrocarbon radicals, monovalent alkoxy radicals, monovalent aryloxy radicals, and the halogens; $p$ is a number from 0 to 3; each H is a hydride radical; $t$ is a number from 1 to 4; M is a quadrivalent metal chosen from the group consisting of germanium, tin and lead; and O is oxygen.

Specific examples of R groups for substitution in the above formula include methyl, 2-methyl-2-butenyl, n-dodecyl, 4-cyclohexylethyl, methylnaphthylethyl, 2,2,1-bicycloheptyl, tolyl, xylyl, xenyl, methoxy, isobutoxy, n-octyloxy, phenoxy and 1,2-naphthoxy.

Specific examples of compounds conforming to the formula.

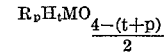

which are suitable for the purposes of the present invention are:

trimethylstannane—$(CH_3)_3SnH$;
triphenylstannane—$(C_6H_5)_3SnH$;
dimethylstannane—$(CH_3)_2SnH_2$;
triethylgermane—$(C_6H_5)_3GeH$;
triphenylgermane—$(C_6H_5)_3GeH$;
tri-α-naphthylgermane—$(\alpha-C_{10}H_7)_3GeH$;
tri-n-hexylgermane—$(n-C_6H_{13})_3GeH$;
di-i-propylgermane—$(i-C_3H_7)_2GeH_2$;
plumbane—$PbH_4$;
germane—$GeH_4$;
stannane—$SnH_4$;
1,2-dihydrotetramethylstannoxane—
   $(CH_3)_2HSnOHSn(CH_3)_2$; and the like.

The catalysts of the present invention are formed when the product of the metathetical reaction (as described above) of hydroxy groups in the surface of carbon black and a transition metal halide is combined in an inert environment with an organometallic compound at temperatures normally between about 0° C. and about 150° C. and at atmospheric pressure, although higher temperatures and pressures can be utilized. The temperatures and/or pressures that need be utilized with any particular combination of components can be readily determined bearing in mind that temperatures and/or pressures that cause substantial decomposition of either of the components of the catalyst should be avoided.

Using the catalyst of this invention, polymerization of mono-olefin and/or di-olefin monomers can be accomplished in the absence of liquids (other than the monomers themselves), solvents or diluents, for example, in the gas phase, but it is usually more convenient to effect polymerization in the presence of a substantially inert liquid reaction medium. Accordingly, an inert liquid reaction medium, is preferably supplied to the reaction zone.

Several classes of hydrocarbons or their mixtures which are liquid and substantially inert under the polymerization conditions of the present process constitute suitable liquid reaction media. Thus, various classes of saturated hydrocarbons such as pure alkanes or cycloalkanes or commercially available mixtures, freed of harmful impurities, are generally suitable for the purposes of the present invention. For example, straight run naphthas or kerosenes containing alkanes and cycloalkanes and liquid or liquefied alkanes such as n-hexane, 2,3-dimethylbutane, n-dodecane, dimethylcyclopentane, methyldecalins, and the like are suitable. Also, members of the aromatic hydrocarbon series, such as isopropyl benzene, ethyltoluene, hemimellitene, pseudocumene, isodurene, isoamylbenzene, and particularly the mononuclear aromatic hydrocarbons such as xylene, mesitylene and xylene-p-cymene mixtures, and the like are completely suitable.

The proportion of surface reacted carbon black to organometallic compound utilized in preparing the catalysts is not usually a critical feature of the process. We have found from experience that a molar ratio of from about 0.1 to about 5 millimoles of the organometallic compound per milliatom of transition metal chemically combined with the surface of the carbon black is to be preferred.

The quantity of catalyst, i.e. comprising both the surface reacted carbon black and the organometallic compound, to be utilized in the polymerization reaction may vary, but in general, the total quantity of catalyst that need be employed based on the weight of the charging stock is very small particularly when a very fine particle size carbon black (i.e. having an average particle diameter of less than about 50 millimicrons) is utilized.

The contact time or space velocity employed in the polymerization process variables such as the particular catalyst utilized the specific type of product desired, and the extent of monomer conversion desired in any given run or pass over the catalyst. In general, this variable is readily adjustable to obtain the desired results.

There follow a number of illustrative non-limiting examples:

Example 1

To a 2000 milliliter, three neck, glass reaction vessel there is added 20 grams of "Supercarbovar," a channel carbon black produced by Cabot Corporation, which has an average particle diameter of 14 millimicrons and a hydroxyl group content on the surface thereof about 1.6 milliequivalents per gram. To said reaction vessel there is added 1700 milliliters of benzene, and the resulting slurry is dried by being heated to, and maintained at, the boiling point of benzene, i.e. about 80° C., for about 20 hours, while a water/benzene azetrope is removed from the reaction vessel by periodic distillation until about 450 milliliters of distillate has been removed. The vessel is then cooled and charged with 20 millimoles of titanium tetrachloride. The resulting slurry is then refluxed for about 6 hours with continuous stirring. Subsequently, the extent of the reaction between the titanium tetrachloride and the hydroxyl groups in the surface of the carbon black is determined by measuring the quantity of HCl that was produced and by testing the liquid contents of the vessel for the absence therein of titanium tetrachloride, and said slurry is found to contain 20 milliatoms of titanium chemically bound to the surface of said carbon black.

To a 2000 milliliter glass, three neck, reaction flask equipped with a magnetic stirrer there is introduced about 100 milliliters of said cocatalyst slurry which contains about 2 milliatoms of titanium bound to the surface of about 2 grams of carbon black. Next, in total darkness, there is added to said vessel a solution comprising about 900 milliliters of anhydrous toluene and 8 millimoles of triphenylstannnane. The contents of the reaction flask are then continuously agitated in darkness at ambient temperatures for about 24 hours. Said slurry is transferred, in toto, and without exposure to the atmosphere to a 4000 milliliter, stainless steel, stirred autoclave. Next, the autoclave is pressurized to, and maintained at, about 200 p.s.i.g. with ethylene and is thereafter stirred continuously for about one hour at about 85° C. after which the solid reaction products are withdrawn and analyzed. It is found that about 65 grams of solid polyethylene have been produced.

When under the same conditions either the triphenylstannane or the carbon black cocatalyst carrying titanium chemically combined to the surface thereof is utilized alone as the catalyst, no solid polymer is produced.

Example 2

To a 2000 milliliter stainless steel, stirred autoclave there is introduced 50 milliliters of the cocatalyst slurry produced in Example 1 which contains about 1 milliatom of titanium bound to the surface of about 1 gram of carbon black. Next, there is introduced into the autoclave about 750 milliliters of anhydrous toluene and 3 millimoles of triethyl germane. The autoclave is heated to, and maintained at, about 110° C. with continuous stirring for 36 hours. Thereafter, there is introduced into the autoclave 200 millimoles of 1,3-butadiene and 200 millimoles of ethylene. Analysis of the solid product reveals that an ethylene-butadiene copolymer has been produced.

Example 3

To a 2000 milliliter, three neck, glass reaction vessel there is added 30 grams of "Vulcan 9," a furnace carbon black produced by Cabot Corporation, and which has an average particle diameter of about 20 millimicrons and a hydroxyl group content on the surface of about 0.05 milliequivalent per gram. Said reaction vessel is then placed in a vacuum drying oven heated to a temperature of about 110° C. for about 24 hours. Subsequently, the vessel is sealed without exposing said carbon black to the atmosphere and there is charged to said vessel one millimole of vanadium oxytrichloride in 500 milliliters of isooctane. The vessel is then continuously stirred, and maintained at refluxing temperature for a period of about 8 hours while the contents thereof are swept by a stream of dry nitrogen. Subsequently, the extent of the reaction between the vanadium oxytrichloride and the carbon black is determined by measuring the quantity of HCl that was produced and by testing the liquid contents of the vessel for the absence therein of vanadium oxytrichloride and the said carbon black is found to have one milliatom of vanadium chemically bound to the surface thereof. This slurry containing 30 grams of carbon black and one milliatom of vanadium is then transferred from this reaction vessel to a one liter stirred autoclave which has been previously flushed with dry nitrogen. Next, five millimoles of diisopropylstannane are added to the autoclave and the autoclave is pressurized to 1000 p.s.i. with propylene. The autoclave is then continuously agitated and maintained at a temperature of about 80° C. for about three hours during which time the pressure therein is maintained at about 275 p.s.i. by the intermittent introduction of propylene. The reaction products are analyzed and it is found that solid polypropylene has been formed.

The polymers produced by the process of this invention can be subjected to such aftertreatment as may be desired to fit them for particular uses or to impart desired properties. Thus, the polymers can be extruded, mechanically milled, filmed or cast, or converted to sponges or latices. Also, antioxidants, stabilizers, fillers such as carbon black or additional silica, extenders, plasticizers, pigments insecticides, fungicides, etc., can be incorporated into the polymers.

Obviously, many changes may be made in the above-described examples and procedure without departing from the scope of the invention. For example, although only transition metal chlorides are mentioned in the above examples, transition metal bromides, iodides and fluorides are also suitable for the purposes of the present invention. For example, titanium tetrafluoride is entirely suitable.

Accordingly, it is intended that the above disclosure be regarded as illustrative and as in no way limiting the scope of the invention.

What we claim is:

1. A process for polymerizing a substance chosen from the group consisting of mono-olefins, mixtures of mono-olefins, di-olefins, mixtures of di-olefins and mixtures thereof which comprises contacting said substance at temperatures between about −25° C. and 250° C., with a catalyst comprising the reaction product of
(a) a finely-divided carbon black carrying in chemical combination on the surface thereof at least about $1 \times 10^{-4}$ equivalents per gram of structures conforming to the formula $$TO_aX_b$$

wherein T is a metal chosen from the group consisting of the metals of Groups IVa, Va and VIa; O is oxygen; a is a number from 0 to 2; each X is any halogen; b is a number from 1 to 5; and wherein said structures are chemically linked directly from T to at least one oxygen atom in the surface of said carbon black, and
(b) a compound conforming to the formula $$R_pH_tMO_{\frac{4-(t+p)}{2}}$$

wherein each R is chosen from the group consisting of monovalent hydrocarbon radicals, monovalent alkoxy radicals, monovalent aryloxy radicals and the halogens; p is a number from 0 to 3; each H is a hydride radical; t is a number from 1 to 4; M is a quadrivalent metal chosen from the group consisting of germanium, tin and lead; and O is oxygen.

2. The process of claim 1 wherein the substance to be polymerized is a di-olefin.

3. The process of claim 1 wherein said carbon black has an average particle diameter of less than about 50 millimicrons.

4. The process of claim 1 wherein in said formula $$TO_aX_b$$

T is a metal of Group IVa, a is 0 and each X is chlorine.

5. The process of claim 1 wherein in said formula $$R_pH_tMO_{\frac{4-(t+p)}{2}}$$

M is tin, each R is any monovalent hydrocarbon radical and p is 3.

6. The process of claim 1 wherein the substance to be polymerized is an α-mono-olefin.

7. A catalyst comprising the reaction product of
(a) finely-divided carbon black carrying in chemical combination on the surface thereof at least about $1 \times 10^{-4}$ equivalents per gram of structures conforming to the formula $$TO_aX_b$$

wherein T is a metal chosen from the group consisting of the metals of Groups IVa, Va and VIa; O is oxygen; a is a number from 0 to 2; each X is any halogen; b is a number from 1 to 5; and wherein said structures are chemically linked directly from T to at least one oxygen atom in the surface of said carbon black, and
(b) an organometallic compound conforming to the formula $$R_pH_tMO_{\frac{4-(t+p)}{2}}$$

wherein each R is chosen from the group consisting of monovalent hydrocarbon radicals, monovalent alkoxy radicals, monovalent aryloxy radicals, and the halogens; p is a number from 0 to 3; each H is a hydride radical; t is a number from 1 to 4; M is a quadrivalent metal chosen from the group consisting of germanium, tin and lead; and O is oxygen.

8. The catalyst of claim 7 wherein in said formula $$TO_aX_b$$

a is 0.

9. The catalyst of claim 7 wherein in said formula $$TO_aX_b$$

T is a metal of Group IVa, a is 0 and each X is chlorine.

10. The catalyst of claim 7 wherein in said formula $$TO_aX_b$$

each X is chlorine.

11. The catalyst o fclaim 7 wherein in said formula $$TO_aX_b$$

T is a metal of Group IVa.

12. The catalyst of claim 7 wherein in said formula $$TO_aX_b$$

T is titanium.

13. The catalyst of claim 7 wherein in said formula $$TO_aX_b$$

T is a metal of Group Va.

14. The catalyst of claim 7 wherein in said formula $$TO_aX_b$$

T is vanadium.

15. The catalyst of claim 7 wherein in said formula $$TO_aX_b$$

T is a metal of Group VIa.

16. The catalyst of claim 7 wherein in said formula $$R_pH_tMO_{\frac{4-(t+p)}{2}}$$

M is tin.

17. The catalyst of claim 7 wherein in said formula

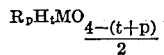

M is germanium.

18. The catalyst of claim 7 wherein in said formula

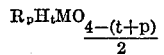

M is tin; and each R is a monovalent hydrocarbon radical.

19. The catalyst of claim 7 wherein in said formula

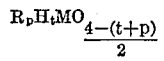

M is tin; each R is a monovalent hydrocarbon radical; and $p$ is 3.

20. The catalyst of claim 7 wherein said carbon black has an average particle diameter of less than about 50 millimicrons.

References Cited by the Examiner
UNITED STATES PATENTS

| | | | |
|---|---|---|---|
| 2,406,477 | 8/46 | Solomon et al. | 252—442 |
| 2,820,778 | 1/58 | Spaenig et al. | 260—94.9 |
| 3,008,949 | 11/61 | Langer et al. | 260—94.9 |

JOSEPH L. SCHOFER, *Primary Examiner.*